United States Patent
Liu (10) Patent No.: US 9,885,928 B2
(45) Date of Patent: Feb. 6, 2018

(54) ARRAY SUBSTRATE, MANUFACTURING METHOD THEREOF, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Xiaona Liu, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 127 days.

(21) Appl. No.: 14/905,498

(22) PCT Filed: Aug. 20, 2015

(86) PCT No.: PCT/CN2015/087591
§ 371 (c)(1),
(2) Date: Jan. 15, 2016

(87) PCT Pub. No.: WO2016/112688
PCT Pub. Date: Jul. 21, 2016

(65) Prior Publication Data
US 2016/0370671 A1 Dec. 22, 2016

(30) Foreign Application Priority Data
Jan. 14, 2015 (CN) .......................... 2015 1 0017710

(51) Int. Cl.
*G02F 1/1343* (2006.01)
*G02F 1/1333* (2006.01)
(Continued)

(52) U.S. Cl.
CPC ........ *G02F 1/134363* (2013.01); *G02F 1/137* (2013.01); *G02F 1/13439* (2013.01);
(Continued)

(58) Field of Classification Search
None
See application file for complete search history.

(56) References Cited

U.S. PATENT DOCUMENTS 5,661,712 A * 8/1997 Chiba ............... G02F 1/133345
349/143
6,801,293 B1 * 10/2004 Nishiyama ........ G02F 1/133512
349/141
(Continued)

FOREIGN PATENT DOCUMENTS

CN 101196664 A 6/2008
CN 102830557 A 12/2012
(Continued)

OTHER PUBLICATIONS

First Office Action dated Nov. 28, 2016 in corresponding Chinese Application No. 201510017710.X.
(Continued)

*Primary Examiner* — Ryan Crockett
(74) *Attorney, Agent, or Firm* — Nath, Goldberg & Meyer; Joshua B. Goldberg; Annie J. Kock (57) ABSTRACT

The invention provides an array substrate, comprising a base substrate, a first electrode layer comprising multiple first electrode strips arranged in a matrix, and a second electrode layer insulated from the first electrode layer, the second electrode layer comprises multiple horizontal electric field generation parts, upper surfaces of the horizontal electric field generation parts are flush with those of the first electrode strips, and in a row or column direction of the matrix, orthogonal projections, on the base substrate, of the first electrode strips alternate with those of the horizontal electric field generation parts. The invention also provides a display device and a manufacturing method of array substrate. By using the array substrate provided by the invention to display, storage capacitance and driving voltage of each
(Continued)

pixel unit are lowered without damaging the overall transmittance in the pixel regions, and uniformity of transmittance in the display area is improved.

20 Claims, 3 Drawing Sheets

(51) Int. Cl.
  *G02F 1/137* (2006.01)
  *G02F 1/1335* (2006.01)
  *G02F 1/1337* (2006.01)
  *G02F 1/1341* (2006.01)
  *G02F 1/1362* (2006.01)
  *G02F 1/1368* (2006.01)

(52) U.S. Cl.
  CPC .. *G02F 1/134309* (2013.01); *G02F 1/134336* (2013.01); *G02F 1/1337* (2013.01); *G02F 1/1341* (2013.01); *G02F 1/1368* (2013.01); *G02F 1/133345* (2013.01); *G02F 1/133514* (2013.01); *G02F 1/136286* (2013.01); *G02F 2001/133357* (2013.01); *G02F 2001/134372* (2013.01); *G02F 2201/121* (2013.01); *G02F 2201/123* (2013.01)

(56) References Cited

U.S. PATENT DOCUMENTS

| | | | | |
|---|---|---|---|---|
| 9,069,202 B2* | 6/2015 | Miyairi | ............. | G02F 1/133345 |
| 9,116,358 B2* | 8/2015 | Hashimoto | ........ | G02B 27/2214 |
| 9,348,178 B2* | 5/2016 | Aoyama | ........... | G02F 1/133707 |
| 2004/0263749 A1* | 12/2004 | Jeong | ................. | G02F 1/134363 |
| | | | | 349/141 |
| 2008/0129901 A1* | 6/2008 | You | ..................... | G02F 1/13718 |
| | | | | 349/33 |
| 2013/0148068 A1* | 6/2013 | Maeda | .............. | G02F 1/134309 |
| | | | | 349/138 |
| 2014/0028940 A1 | 1/2014 | Ahn | | |
| 2014/0333880 A1* | 11/2014 | Zhang | ............... | G02F 1/134363 |
| | | | | 349/138 |
| 2014/0353672 A1* | 12/2014 | Choi | ................. | G02F 1/133345 |
| | | | | 257/72 |
| 2015/0378220 A1* | 12/2015 | Cao | ................... | G02F 1/134309 |
| | | | | 349/123 |
| 2016/0187737 A1* | 6/2016 | Dai | ................... | G02F 1/134309 |
| | | | | 349/123 |

FOREIGN PATENT DOCUMENTS

| | | |
|---|---|---|
| CN | 102929045 A | 2/2013 |
| CN | 203786441 U | 8/2014 |
| CN | 104122701 A | 10/2014 |
| CN | 104503168 A | 4/2015 |
| CN | 204374568 U | 6/2015 |

OTHER PUBLICATIONS

International Search Report issued in corresponding International Application No. PCT/CN2015/087591 along with an English translation of the Written Opinion of the International Searching Authority.

* cited by examiner

Fig. 1

(Prior Art)

ARRAY SUBSTRATE, MANUFACTURING METHOD THEREOF, AND DISPLAY DEVICE

This is a National Phase Application filed under 35 U.S.C. 371 as a national stage of PCT/CN2015/087591, filed Aug. 20, 2015, an application claiming the benefit of Chinese Application No. 201510017710.X, filed Jan. 14, 2015, the content of each of which is hereby incorporated by reference in its entirety.

FIELD OF THE INVENTION

The present invention relates to the field of display technology, and particularly relates to an array substrate, a manufacturing method of the array substrate, and a display device comprising the array substrate.

BACKGROUND OF THE INVENTION

Figure 1:
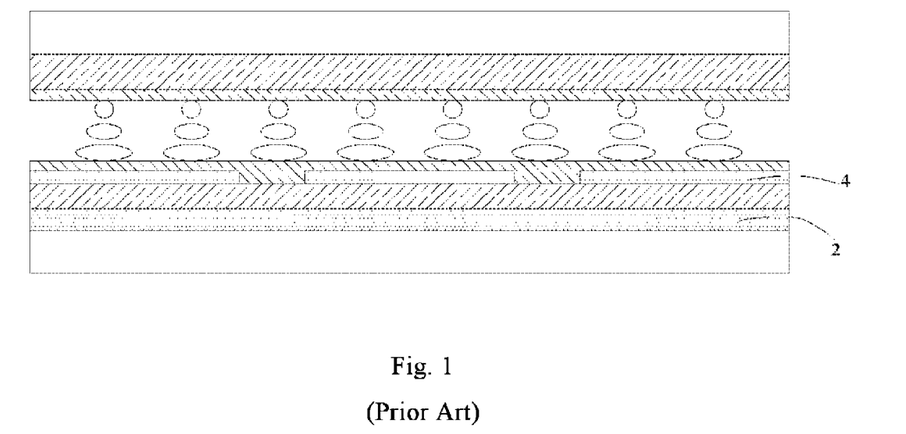
FIG. 1 is a schematic diagram of a structure of an existing FFS mode liquid crystal display panel.

FIG. 1 is a schematic diagram of a structure of an existing FFS (Fringe Field Switching) mode liquid crystal display panel. As shown in FIG. 1, pixel electrodes 4 and a plate-like common electrode 2 are provided on the array substrate of the liquid crystal display panel. Liquid crystal molecules are driven to rotate by using a horizontal component of the fringe field formed between the pixel electrodes 4 and the plate-like common electrode 2.

As the common electrode 2 is positioned below the pixel electrodes 4, the liquid crystal display panel shown in FIG. 1 has a relatively strong vertical electric field, but the horizontal electric field thereof is relatively weak.

It can be seen that, how to increase the horizontal electric field of a FFS mode liquid crystal display panel during display has become an urgent technical problem to be solved.

SUMMARY OF THE INVENTION

An object of the present invention is to provide an array substrate, a display device comprising the array substrate and a manufacturing method of the array substrate. The display device comprising the array substrate can generate a relatively strong horizontal electric field during display.

To achieve the above object, as one aspect of the present invention, there is provided an array substrate, which comprises a base substrate, a first electrode layer, and a second electrode layer insulated from the first electrode layer, the first electrode layer comprises a plurality of first electrode strips arranged in a matrix, the second electrode layer comprises a plurality of horizontal electric field generation parts, upper surfaces of the plurality of horizontal electric field generation parts are flush with those of the plurality of first electrode strips, and in a row or column direction of the matrix, orthogonal projections, on the base substrate, of the plurality of first electrode strips alternate with those of the plurality of horizontal electric field generation parts.

Preferably, the array substrate further comprises a plurality of insulating strips, which are provided below the plurality of horizontal electric field generation parts, respectively, so as to make the upper surfaces of the plurality of horizontal electric field generation parts flush with the upper surfaces of the plurality of first electrode strips.

Preferably, the second electrode layer further comprises a plurality of connection parts, each of which connects two adjacent horizontal electric field generation parts, the plurality of first electrode strips are positioned above the plurality of connection parts, respectively, and projections of the plurality of connection parts and the plurality of horizontal electric field generation parts on the base substrate of the array substrate together form a rectangular area.

Preferably, the second electrode layer further comprises a plurality of connection parts, each of which connects end portions, at the same side, of two adjacent horizontal electric field generation parts.

Preferably, the array substrate further comprises an insulating layer, which covers the second electrode layer, and on which the first electrode layer is formed.

Preferably, the first electrode layer is a pixel electrode layer, and the second electrode layer is a common electrode layer.

As another aspect of the present invention, there is provided a display device, which comprises an array substrate, wherein the array substrate is any one of the above array substrates provided by the present invention.

As still another aspect of the present invention, there is provided a manufacturing method of an array substrate, comprising steps of:

forming a second electrode layer, wherein the second electrode layer comprises a plurality of horizontal electric field generation parts; and forming a first electrode layer, wherein the first electrode layer and the second electrode layer are insulated from each other, the first electrode layer comprises a plurality of first electrode strips, upper surfaces of the plurality of horizontal electric field generation parts are flush with those of the plurality of first electrode strips, and in a row or column direction of the matrix, orthogonal projections, on the base substrate, of the plurality of first electrode strips alternate with those of the plurality of horizontal electric field generation parts.

Preferably, before the step of forming a second electrode layer, the manufacturing method further comprises a step of:

forming a pattern including a plurality of insulating strips whose positions correspond to those of the plurality of horizontal electric field generation parts.

After the step of forming a second electrode layer and before the step of forming a first electrode layer, the manufacturing method further comprises a step of:

forming an insulating layer, which covers a base substrate with the second electrode layer formed thereon.

Preferably, the second electrode layer formed in the step of forming a second electrode layer further includes a plurality of connection parts, each of which connects two adjacent horizontal electric field generation parts, orthogonal projections of the plurality of connection parts and the plurality of horizontal electric field generation parts on the base substrate together form a rectangular area, and the plurality of first electrode strips formed in the step of forming a first electrode layer are positioned above the plurality of connection parts, respectively.

Preferably, the second electrode layer formed in the step of forming a second electrode layer further includes a plurality of connection parts, each of which connects end portions, at the same side, of two adjacent horizontal electric field generation parts.

As the upper surfaces of the first electrode strips are flush with those of the horizontal electric field generation parts, when a display device including the array substrate is powered on and displays, electric fields formed between the first electrode strips and the horizontal electric field generation parts have a relatively large horizontal component and a relatively small vertical component. It can be further seen that when the display device including the array substrate is powered on and displays, storage capacitances between first electrodes in the first electrode layer and second electrodes in the second electrode layer are relatively small, thus time required for charging the storage capacitors is shortened. As the electric fields formed between the first electrode strips and the horizontal electric field generation parts have a relatively large horizontal component, a relatively low driving voltage is enough to drive the liquid crystal molecules to rotate.

Therefore, by using the array substrate provided by the present invention to display, storage capacitance and driving voltage of each pixel unit are lowered without damaging the overall transmittance in the pixel regions, and uniformity of transmittance in the display area is improved,

BRIEF DESCRIPTION OF THE DRAWINGS

The accompanying drawings, which constitute a part of the specification, are used for providing a further understanding of the present invention, and are used for explaining the present invention together with the following specific implementations, rather than limiting the present invention. In the drawings.

DETAILED DESCRIPTION OF THE EMBODIMENTS

Specific implementations of the present invention will be described in detail below in conjunction with the accompanying drawings. It should be understood that, the specific implementations described herein are merely used for describing and explaining the present invention, rather than limiting the present invention.

As one aspect of the present invention, there is provided an array substrate, which comprises a base substrate 50, a first electrode layer, and a second electrode layer insulated from the first electrode layer, the first electrode layer comprises a plurality of first electrode strips 40 arranged in a matrix, the second electrode layer comprises a plurality of horizontal electric field generation parts 21, upper surfaces of the plurality of horizontal electric field generation parts 21 are flush with those of the plurality of first electrode strips 40, and in a row or column direction of the matrix, orthogonal projections, on the base substrate 50, of the plurality of first electrode strips 40 alternate with those of the plurality of horizontal electric field generation parts 21.

Figure 2:
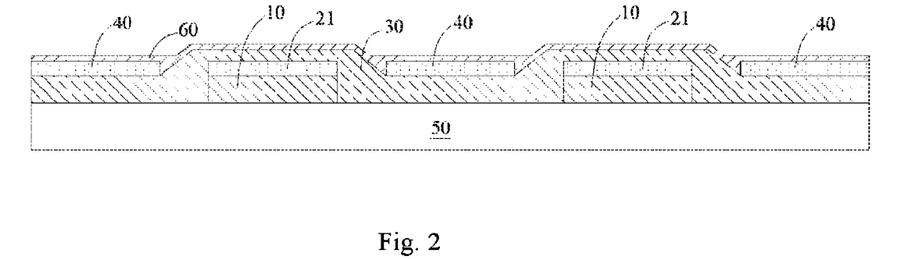
FIG. 2 is a schematic diagram of a structure of an array substrate in a first implementation provided by the present invention.
Figure 4:
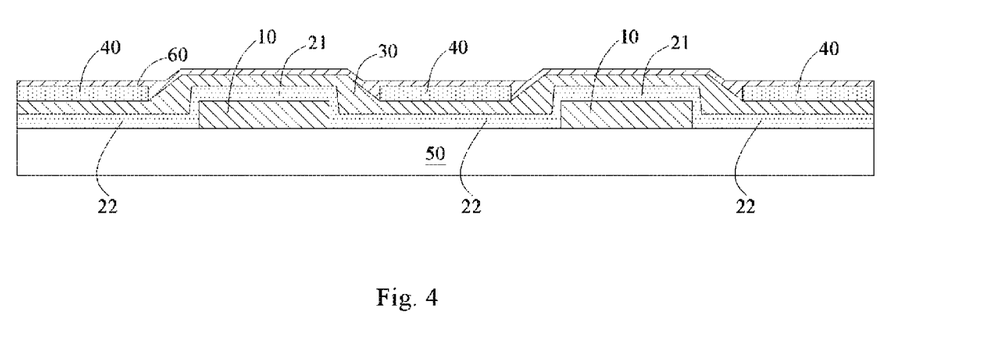
FIG. 4 is a schematic diagram of a structure of an array substrate in a second implementation provided by the present invention.

It should be noted that, the directional word "upper" used in the context refers to the "upper" direction in FIGS. 2 and 4. The expression "upper surfaces of the plurality of horizontal electric field generation parts 21 are flush with those of the plurality of first electrode strips 40" means that the upper surface of each horizontal electric field generation part 21 and the upper surface of each first electrode strip 40 are in the same plane. The "horizontal" direction used in the context refers to the left-right direction in FIGS. 2 and 4, and the "vertical" direction used in the context refers to the up-down direction in FIGS. 2 and 4. Needless to say, those skilled in the art should understand that "being flush with" in the context refers to being approximately, but not strictly, in the same plane, that is, a difference between a distance from the upper surface of each horizontal electric field generation part 21 to the upper surface of the base substrate 50 and a distance from the upper surface of each first electrode strip 40 to the upper surface of the base substrate 50 is controlled to be as small as possible in the achievable range of industrial production. Those skilled in the art can readily understand that one of the first and second electrode layers is a pixel electrode layer, and the other is a common electrode layer. In the specific implementations of the present invention, descriptions are given by taking a case where the first electrode layer is the pixel electrode layer and the second electrode layer is the common electrode layer as an example.

Since the upper surface of each first electrode strip 40 is flush with that of each horizontal electric field generation part 21, when a display device including the above-described array substrate is powered on and displays, an electric field formed between each first electrode strip 40 and the horizontal electric field generation parts 21 adjacent thereto has a relatively large horizontal component and a relatively small vertical component. It can be further known that when the display device including the above-described array substrate is powered on and displays, storage capacitance between the first electrode layer and the second electrode layer is relatively small, and thus time required for charging the storage capacitance is shortened. As the electric field formed between each first electrode strip 40 and the horizontal electric field generation parts 21 adjacent thereto has a relatively large horizontal component, a relatively low driving voltage Vop is required to drive the liquid crystal molecules to rotate.

Therefore, by using the array substrate provided by the present invention to display, storage capacitance and driving voltage Vop of each pixel unit can be lowered without damaging the overall transmittance in the pixel regions. It can be understood that, in the present invention, because the first electrode strip 40 and the horizontal electric field generation part 21 in each pixel unit have the structures described above, and the electric field formed between each first electrode strip 40 and the horizontal electric field generation part 21 adjacent thereto has a relatively large horizontal component, the electric field generated in each pixel unit has a relatively large horizontal component, as a result, the electric field generated in each pixel unit exerts a relatively large driving force on the liquid crystal molecules, so that the liquid crystal molecules corresponding to each pixel unit are rotated reliably, and thus uniformity of transmittance in the display area is improved.

In the present invention, thicknesses of the first electrode strip 40 and the horizontal electric field generation part 21 are not particularly limited, as long as the upper surface of each horizontal electric field generation part 21 is flush with that of each first electrode strip 40. For example, the thickness of each horizontal electric field generation part 21 may be increased, so as to make the upper surface of the horizontal electric field generation part 21 flush with that of each first electrode strip 40.

As a preferable implementation of the present invention, the array substrate may further comprise a plurality of insulating strips 10, and the plurality of insulating strips 10 are provided below the plurality of horizontal electric field generation parts 21, respectively, so as to make the upper surfaces of the plurality of horizontal electric field generation parts 21 flush with those of the plurality of first electrode strips 40. In order to insulate the first electrode layer from the second electrode layer, the array substrate may further comprise an insulating layer 30, which covers the second electrode layer, and on which the first electrode layer is formed.

Figure 3:
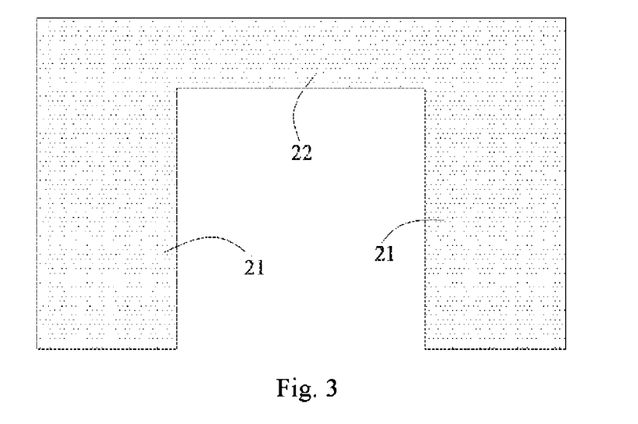
FIG. 3 is a top view of a second electrode layer in the array substrate shown in FIG. 2.

As a first specific implementation of the present invention, the second electrode layer has a structure as shown in FIGS. 2 and 3. As shown in FIG. 3, the second electrode layer may further comprise a plurality of connection parts 22, each of which connects end portions, at the same side, of two adjacent horizontal electric field generation parts 21.

Figure 5:
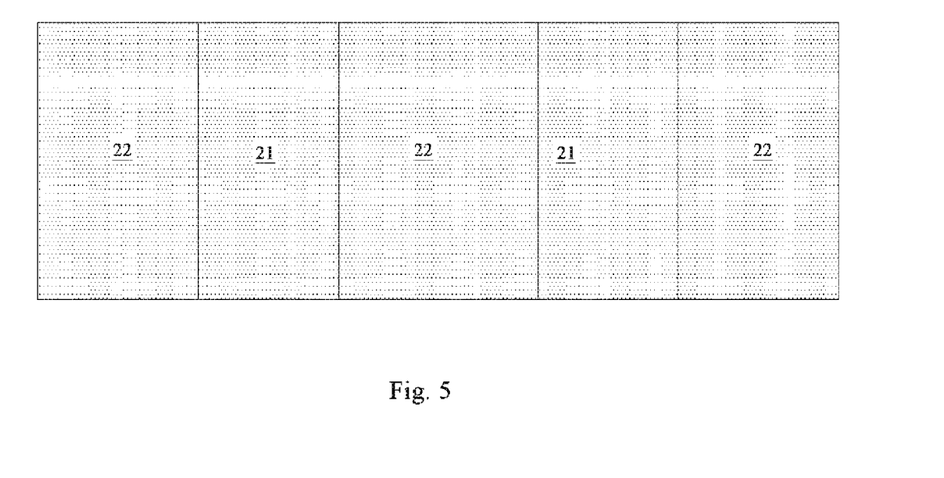
FIG. 5 is a top view of a second electrode layer in the array substrate shown in FIG. 4.

As a second specific implementation of the present invention, the second electrode layer has a structure as shown in FIG. 4. As shown in FIG. 4, the second electrode layer also comprises a plurality of connection parts 22, each of which connects two adjacent horizontal electric field generation parts 21, and the plurality of first electrode strips 40 are positioned above the plurality of connection parts 22, respectively. The directional word "above" used here refers to the "upper" direction in FIG. 4. In this implementation, orthogonal projections, on the base substrate 50, of the plurality of horizontal electric field generation parts 21 and the plurality of connection parts 22 together form the rectangular area as shown in FIG. 5.

It should be noted that, the row and column of the matrix formed by the plurality of first electrode strips are not specifically limited in the present invention, for example, a "row" becomes a "column" after being rotated by 90 degrees. It can be understood that, when the second electrode layer has the structure shown in FIG. 3 or 5, the horizontal electric field generation parts 21 alternate with the first electrode strips 40 in the horizontal direction of FIG. 2 or 4, whereas in another direction (the direction perpendicular to the principal plane, or the direction in which the horizontal electric field generation parts 21 extend), only the horizontal electric field generation parts 21 or electrode strips 40 are provided.

In addition, the structure of the horizontal electric field generation part 21 is not specifically limited in the present invention, as long as it can be ensured that the horizontal electric field generation parts 21 can be connected to guarantee stable input of a common electrode signal.

Those skilled in the art should understand that, in order to achieve normal display, the array substrate further includes structures such as gate lines, data lines, thin film transistors, and the like. Since the settings of these structures are known to those skilled in the art, the detailed descriptions thereof are omitted in the present invention.

In a case where the thin film transistors in the array substrate have a bottom-gate structure, the base substrate 50 may include a transparent substrate, a gate line layer formed on the transparent substrate, a gate insulating layer formed on the gate line layer, an active area layer formed on the gate insulating layer, a source-drain layer formed on the active area layer, and a planarization layer formed on the source-drain layer. The insulating strips 10 may be formed on the planarization layer (not shown in the drawings).

It can be understood that, the first electrode layer includes first electrodes of a plurality of pixel units, and the second electrode layer includes second electrodes of the plurality of pixel units; the gate line layer includes gate lines, common electrode lines, gates and the like; the active area layer includes active areas of a plurality of thin film transistors; the source-drain layer includes sources and drains of the plurality of thin film transistors. The first electrodes may be pixel electrodes, and the second electrodes may be common electrodes. To achieve initial orientations of liquid crystal molecules, an alignment film 60 may be further formed on the array substrate, as shown in FIGS. 2 and 4. The alignment film 60 covers the base substrate 50 with the first and second electrode layers formed thereon.

As another aspect of the present invention, there is provided a display device, which comprises an array substrate, wherein the array substrate is any one of the above array substrates provided by the present invention.

As the display device includes any one of the above array substrates provided by the present invention, the display device, during display, has relatively small storage capacitance and needs a relatively low operating voltage.

It can be readily understood that, the display device may further include an opposite substrate which is assembled with the array substrate. Liquid crystal material is filled between the opposite substrate and the array substrate. The opposite substrate may be a color filter substrate.

Compared with the prior art shown in FIG. 1, when the display device including the array substrate shown in FIG. 2 is used to display, the storage capacitance decreases by 79.8%, the operating voltage is lowered by 0.3V, thus the time required for charging is greatly shortened, and the overall power consumption of the display device is lowered. In addition, fluctuation range of the largest transmittance in pixel regions decreases from 0.0184 to 0.0139, and it can be seen that the uniformity of transmittance in the display area of the display device including the array substrate shown in FIG. 2 is improved. When the display device including the array substrate shown in FIG. 4 is used to display, the storage capacitance decreases by 1.5%, the operating voltage is lowered by 0.3V, thus the time required for charging is shortened to a certain extent, and the overall power consumption of the display device is lowered as well. In addition, the fluctuation range of the largest transmittance in pixel regions decreases from 0.0184 to 0.0146, and it can be seen that the uniformity of transmittance in the display area of the display device including the array substrate shown in FIG. 4 is improved.

The display device provided by the present invention may be an electronic device such as a mobile phone, a tablet computer, a computer monitor, a television, a navigator, a digital photo frame, or the like.

Figure 6:
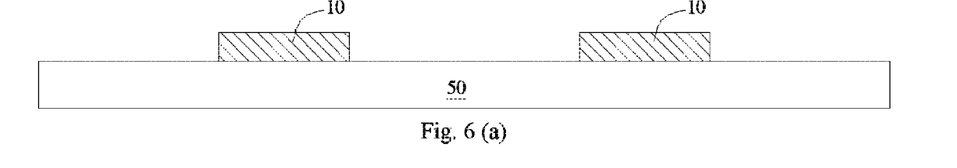
FIGS. 6(a) to 6(d) are schematic diagrams illustrating processes of manufacturing the array substrate shown in FIG. 2.

As still another aspect of the present invention, there is provided a manufacturing method of the above array substrate, the manufacturing method of the array substrate includes steps of:

forming a second electrode layer, wherein the second electrode layer comprises a plurality of horizontal electric field generation parts 21 (see FIG. 6(*b*)); and forming a first electrode layer, wherein the first electrode layer and the second electrode layer are insulated from each other, the first electrode layer comprises a plurality of first electrode strips 40, upper surfaces of the plurality of first electrode strips 40 are flush with those of the plurality of horizontal electric field generation parts 21 (see FIG. 6(*d*)), and orthogonal projections, on a base substrate 50, of the plurality of first electrode strips 40 alternate with those of the plurality of horizontal electric field generation parts 21.

In the present invention, the specific method for forming the second electrode layer is not particularly limited. For example, a traditional photolithographic patterning process may be used to form the second electrode layer including the plurality of horizontal electric field generation parts 21, and alternatively, mask evaporation or the like may be used to form the second electrode layer including the plurality of horizontal electric field generation parts 21.

Similarly, the specific method for forming the first electrode layer is not particularly limited in the present invention. For example, a traditional photolithographic patterning process may be used to form the first electrode layer including the plurality of first electrode strips 40, and alternatively, mask evaporation or the like may be used to form the first electrode layer including the plurality of first electrode strips 40.

In order to make the upper surface of each first electrode strip 40 flush with the upper surface of each horizontal electric field generation part 21, preferably, before the step of forming a second electrode layer, the manufacturing method further comprises a step of: forming a pattern including a plurality of insulating strips 10, and positions of the plurality of insulting strips 10 correspond to those of the plurality of horizontal electric field generation parts 21 (see FIG. 6(b)), respectively. It can be readily understood that, both the number and the shape of the insulating strips 10 are the same as those of the horizontal electric field generation parts 21. By forming the insulating strips 10 at positions corresponding to the horizontal electric field generation parts 21, the distance from each horizontal electric field generation part 21 to the upper surface of the base substrate 50 can be increased, which helps to make the uppers surfaces of the first electrode strips 40 to be formed subsequently flush with the upper surfaces of the horizontal electric field generation parts 21. In the present invention, a silicon oxide (SiOx) or a silicon nitride (SiNx) may be used to form the insulating strips 10, and alternatively, an organic resin material may be used to form the insulating strips 10.

In the present invention, the specific process for forming the insulating strips 10 is not particularly limited. For example, a traditional photolithographic process may be used to form, on the base substrate 50, a pattern including a plurality of insulating strips 10.

Specifically, steps for forming the pattern including a plurality of insulating strips 10 may specifically include:
  forming an insulating material layer on a planarization layer;
  coating a photoresist layer on the insulating material layer;
  performing exposure and development on the photoresist layer by using a mask plate; and
  performing dry etching or wet etching on the insulating material layer by using the photoresist layer subjected to the exposure and development as a mask, so as to form the pattern including the plurality of insulating strips 10.

In order to insulate the first electrode layer from the second electrode layer, preferably, after the step of forming a second electrode layer and before the step of forming a first electrode layer, the manufacturing method may further comprise a step of:
  forming an insulating layer 30, which covers the base substrate 50 with the second electrode layer formed thereon (as shown in FIG. 6(c)).

The insulating layer 30 may be made of a silicon oxide (SiOx) or a silicon nitride (SiNx). The insulating layer 30 may be formed on the base substrate 50 with the second electrode layer formed thereon by way of evaporation or chemical vapor deposition.

Accordingly, the first electrode layer including the plurality of first electrode strips 40 is formed on the insulating layer 30 (as shown in FIG. 6(d)).

The manufacturing method further includes, after the step of forming a pattern including the plurality of first electrode strips 40, a step of:
  forming an alignment layer.

The alignment layer is used to provide the liquid crystal molecules with a pretilt angle. In the present invention, a resin material may be used to form the alignment layer. Specifically, steps for forming the alignment layer include:
  coating a resin layer on the base substrate with the first electrode layer formed thereon; and
  obtaining the alignment layer by rubbing.

As a first specific implementation of the present invention, the second electrode layer has a structure as shown in FIGS. 2 and 3. As shown in FIG. 3, the second electrode layer further comprises a plurality of connection parts 22, each of which connects end portions, at the same side, of two adjacent horizontal electric field generation parts 21.

As a second specific implementation of the present invention, the second electrode layer has a structure as shown in FIG. 4. As shown in FIG. 4, the second electrode layer also comprises a plurality of connection parts 22, each of which connects two adjacent horizontal electric field generation parts 21, and the plurality of first electrode strips 40 are positioned above the plurality of connection parts 22, respectively. In this implementation, orthogonal projections, on the base substrate 50, of the plurality of horizontal electric field generation parts 21 and the plurality of connection parts 22 together form the rectangular area as shown in FIG. 5.

Those skilled in the art could understand that, the mask plate for forming the second electrode layer shown in FIG. 3 and the mask plate for forming the second electrode layer shown in FIG. 5 have different patterns.

In the present invention, the first electrode layer and the second electrode layer are formed by using a transparent electrode material (e.g., ITO), respectively.

As described above, other elements such as gate lines, data lines, thin film transistors and the like are formed on the base substrate. In a case where the thin film transistors have a bottom-gate structure, the manufacturing method includes, before the step of forming a pattern including the plurality of insulating strips, a step of:
  forming a gate line layer on a transparent base substrate;
  forming a gate insulating layer on the gate line layer;
  forming an active area layer on the gate insulating layer;
  forming a source-drain layer on the active area layer; and
  forming a planarization layer on the source-drain layer.

It can be understood that, the first electrode layer includes first electrodes of a plurality of pixel units, and the second electrode layer includes second electrodes of the plurality of pixel units; the gate line layer includes gate lines, common electrode lines, gates and the like; the active area layer includes active areas of a plurality of thin film transistors; the source-drain layer includes sources and drains of the plurality of thin film transistors.

The first electrodes may be pixel electrodes, and the second electrodes may be common electrodes. Therefore, the first electrodes may be connected to drains in the source-drain layer through via holes, and the second electrodes may be connected to common electrode lines in the gate line layer through via holes.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. An array substrate, comprising a base substrate, a first electrode layer, and a second electrode layer insulated from the first electrode layer, the first electrode layer comprising a plurality of first electrode strips arranged in a matrix, wherein, the second electrode layer comprises a plurality of horizontal electric field generation parts, upper surfaces of the plurality of horizontal electric field generation parts are flush with those of the plurality of first electrode strips, in a row or column direction of the matrix, orthogonal projections, on the base substrate, of the plurality of first electrode strips alternate with those of the plurality of horizontal electric field generation parts, the array substrate further comprises an insulating layer, the second electrode layer is formed on the base substrate, the insulating layer is formed on a surface of the second electrode layer distal to the base substrate, and the first electrode layer is formed on a surface of the insulating layer distal to the second electrode layer.

2. The array substrate according to claim 1, wherein, the array substrate further comprises a plurality of insulating strips, which are provided below the plurality of horizontal electric field generation parts, respectively, so as to make the upper surfaces of the plurality of horizontal electric field generation parts flush with the upper surfaces of the plurality of first electrode strips.

3. The array substrate according to claim 2, wherein, the second electrode layer further comprises a plurality of connection parts, each of which connects two adjacent horizontal electric field generation parts, the plurality of first electrode strips are positioned above the plurality of connection parts, respectively, and orthogonal projections, on the base substrate, of the plurality of connection parts and the plurality of horizontal electric field generation parts together form a rectangular area.

4. The array substrate according to claim 2, wherein, the second electrode layer further comprises a plurality of connection parts, each of which connects end portions, at the same side, of two adjacent horizontal electric field generation parts.

5. The array substrate according to claim 1, wherein the insulating layer covers the second electrode layer.

6. The array substrate according to claim 5, wherein, the first electrode layer is a pixel electrode layer, and the second electrode layer is a common electrode layer.

7. The array substrate according to claim 5, wherein, the first electrode layer is a pixel electrode layer, and the second electrode layer is a common electrode layer.

8. A display device, comprising an array substrate, which comprises a base substrate, a first electrode layer, and a second electrode layer insulated from the first electrode layer, the first electrode layer comprising a plurality of first electrode strips arranged in a matrix, wherein, the second electrode layer comprises a plurality of horizontal electric field generation parts, upper surfaces of the plurality of horizontal electric field generation parts are flush with those of the plurality of first electrode strips, in a row or column direction of the matrix, orthogonal projections, on the base substrate, of the plurality of first electrode strips alternate with those of the plurality of horizontal electric field generation parts, the array substrate further comprises an insulating layer, the second electrode layer is formed on the base substrate, the insulating layer is formed on a surface of the second electrode layer distal to the base substrate, and the first electrode layer is formed on a surface of the insulating layer distal to the second electrode layer.

9. The display device according to claim 8, wherein, the array substrate further comprises a plurality of insulating strips, which are provided below the plurality of horizontal electric field generation parts, respectively, so as to make the upper surfaces of the plurality of horizontal electric field generation parts flush with the upper surfaces of the plurality of first electrode strips.

10. The display device according to claim 9, wherein, the second electrode layer further comprises a plurality of connection parts, each of which connects two adjacent horizontal electric field generation parts, the plurality of first electrode strips are positioned above the plurality of connection parts, respectively, and orthogonal projections, on the base substrate, of the plurality of connection parts and the plurality of horizontal electric field generation parts together form a rectangular area.

11. The display device according to claim 9, wherein, the second electrode layer further comprises a plurality of connection parts, each of which connects end portions, at the same side, of two adjacent horizontal electric field generation parts.

12. The display device according to claim 8, wherein, the insulating layer covers the second electrode layer.

13. The display device according to claim 12, wherein, the first electrode layer is a pixel electrode layer, and the second electrode layer is a common electrode layer.

14. The display device according to claim 8, wherein, the first electrode layer is a pixel electrode layer, and the second electrode layer is a common electrode layer.

15. A manufacturing method of an array substrate, comprising steps of:
forming a second electrode layer on a base substrate, wherein the second electrode layer comprises a plurality of horizontal electric field generation parts; and
forming a first electrode layer, the first electrode layer and the second electrode layer being insulated from each other, wherein the first electrode layer comprises a plurality of first electrode strips, upper surfaces of the plurality of horizontal electric field generation parts are flush with those of the plurality of first electrode strips, and in a row or column direction of the matrix, orthogonal projections, on the base substrate, of the plurality of first electrode strips alternate with those of the plurality of horizontal electric field generation parts,
wherein after the step of forming a second electrode layer and before the step of forming a first electrode layer, the manufacturing method further comprises a step of:
forming, on a surface of the second electrode distal to the base substrate, an insulating layer, wherein the first electrode layer is formed on a surface of the insulating layer distal to the second electrode layer.

16. The manufacturing method according to claim 15, further comprising, before the step of forming a second electrode layer, a step of:
forming a pattern including a plurality of insulating strips whose positions correspond to those of the plurality of horizontal electric field generation parts.

17. The manufacturing method according to claim 15, wherein:
the insulating layer is formed to cover the base substrate on which the second electrode layer is formed.

18. The manufacturing method according to claim 15, wherein, the second electrode layer formed in the step of forming a second electrode layer further includes a plurality of connection parts, each of which connects two adjacent horizontal electric field generation parts, orthogonal projections, on the base substrate of the array substrate, of the plurality of connection parts and the plurality of horizontal electric field generation parts together form a rectangular area, and the plurality of first electrode strips formed in the step of forming a first electrode layer are positioned above the plurality of connection parts, respectively.

19. The manufacturing method according to claim 18, wherein, the second electrode layer formed in the step of forming a second electrode layer further includes a plurality of connection parts, each of which connects end portions, at the same side, of two adjacent horizontal electric field generation parts.

20. The manufacturing method according to claim 15, herein, the second electrode layer formed in the step of forming a second electrode layer further includes a plurality of connection parts, each of which connects end portions, at the same side, of two adjacent horizontal electric field generation parts.

\* \* \* \* \*